United States Patent [19]
Hasegawa

[11] Patent Number: 5,905,717
[45] Date of Patent: May 18, 1999

[54] ECHO CANCELLER FOR A PACKET SIGNAL

[75] Inventor: Atsushi Hasegawa, Tokyo, Japan

[73] Assignee: NEC Corporation, Tokyo, Japan

[21] Appl. No.: 08/757,411

[22] Filed: Nov. 27, 1996

[30] Foreign Application Priority Data

Nov. 29, 1995 [JP] Japan ..................................... 7-309639

[51] Int. Cl.⁶ ................................. H04B 3/23; H04L 5/14
[52] U.S. Cl. ........................... 370/289; 370/290; 379/410
[58] Field of Search ................................... 370/286, 289, 370/290, 291; 379/406, 410, 411; 375/346, 350; 364/724.01, 724.12, 724.19

[56] References Cited

U.S. PATENT DOCUMENTS

| | | | |
|---|---|---|---|
| 5,263,020 | 11/1993 | Yatsuzuka et al. | 370/289 |
| 5,272,695 | 12/1993 | Makino et al. | 370/291 |
| 5,539,731 | 7/1996 | Haneda et al. | 370/286 |
| 5,606,550 | 2/1997 | Jangi | 370/289 |

*Primary Examiner*—Alpus H. Hsu
*Attorney, Agent, or Firm*—Scully, Scott Murphy and Presser

[57] ABSTRACT

An echo canceller of the present invention and for packet signals includes a buffer (4) for converting the rate of a residual echo, and a buffer (1) for converting the rate of a received packet. An echo path estimator (2) generates, by referencing the outputs of the buffers (1, 4), filter coefficients for estimating an echo path. An adaptive FIR (Finite Impulse Response) filter (3) performs convolutional computation with the filter coefficients and the output of the buffer (1) for thereby outputting a false echo component. A buffer (5) packetizes the false echo component. A subtracter (6) subtracts the packetized false echo component from a packet to be transmitted so as to cancel an echo. Because a line assigned to the packet to be transmitted involves only subtraction, the echo canceller prevents packets from being delayed.

6 Claims, 5 Drawing Sheets

INPUT DATA

OUTPUT DATA (PACKET DATA)

ECHO CANCELLER FOR A PACKET SIGNAL

BACKGROUND OF THE INVENTION

The present invention relates to an echo canceler and, more particularly, to an echo canceler suitable for a packet data signal.

Generally, to cancel an echo, an echo canceller generates a false echo component by referencing a received signal, and then subtracts the false echo component from a signal to be transmitted. A signal remaining in the signal undergone echo cancellation, i.e., a residual echo signal is used to update the filter coefficients of an adaptive FIR (Finite Impulse Response) filter for echo estimation. As a result, the residual echo signal is brought close to zero.

A conventional echo canceller for packet data signals includes a receive buffer for converting the rate of a packet data signal to be input to an FIR filter to a preselected rate. On the other hand, a received signal is reflected by a four-wire/two-wire converter and introduced into the signal to be transmitted as an echo component. In light of this, the echo canceller further includes a transmit buffer for converting the rate of the packet signal to be transmitted to a preselected rate. If the rate of the packet data signal or burst signal is not converted, then the filter will be required to have an extremely high-speed computation capability and will thereby make it difficult to implement the hardware of the echo canceller.

The FIR filter for estimating an echo by the above signal rate conversion can be implemented with the conventional processing speed. However, a delay ascribable to the signal rate conversion inevitably occurs between the input and the output of a transmission line on which echo cancellation is effected, aggravating a channel delay.

SUMMARY OF THE INVENTION

It is therefore an object of the present invention to provide an echo canceller capable of eliminating the above problem particular to the conventional echo canceller and obviating the channel delay.

An echo canceller of the present invention includes a rate converting circuit assigned to the receipt side for converting a received packet signal to data having a preselected rate. A subtracter subtracts an echo signal from a packet signal to be transmitted. A rate converting circuit assigned to the transmission side converts the residual echo packet signal to data having a preselected rate. An echo path estimator estimates an echo path characteristic based on the outputs of the two rate converting circuits to thereby generate corrected filter coefficients matching the echo path characteristic. An FIR filter receives the corrected filter coefficients and filters the received packet signal therewith to thereby estimate an echo component. An output signal rate converting circuit converts the estimated echo packet signal to an echo packet signal.

An identification-by-learning method (Full Tap-NLMS) is one of conventional schemes available for an echo canceller using an FIR filter. This method involves echo path estimation, false echo generation, and echo cancellation. In accordance with the present invention, the echo path estimation and false echo generation are executed after the conversion of a signal rate while only the echo cancellation is executed at the signal rate of packet data. With this procedure, it is possible to minimize the interval between the input and the output of packet data.

BRIEF DESCRIPTION OF THE DRAWINGS

The above and other objects, features and advantages of the present invention will become more apparent from the following detailed description when taken with the accompanying drawings in which.

Figure 1:
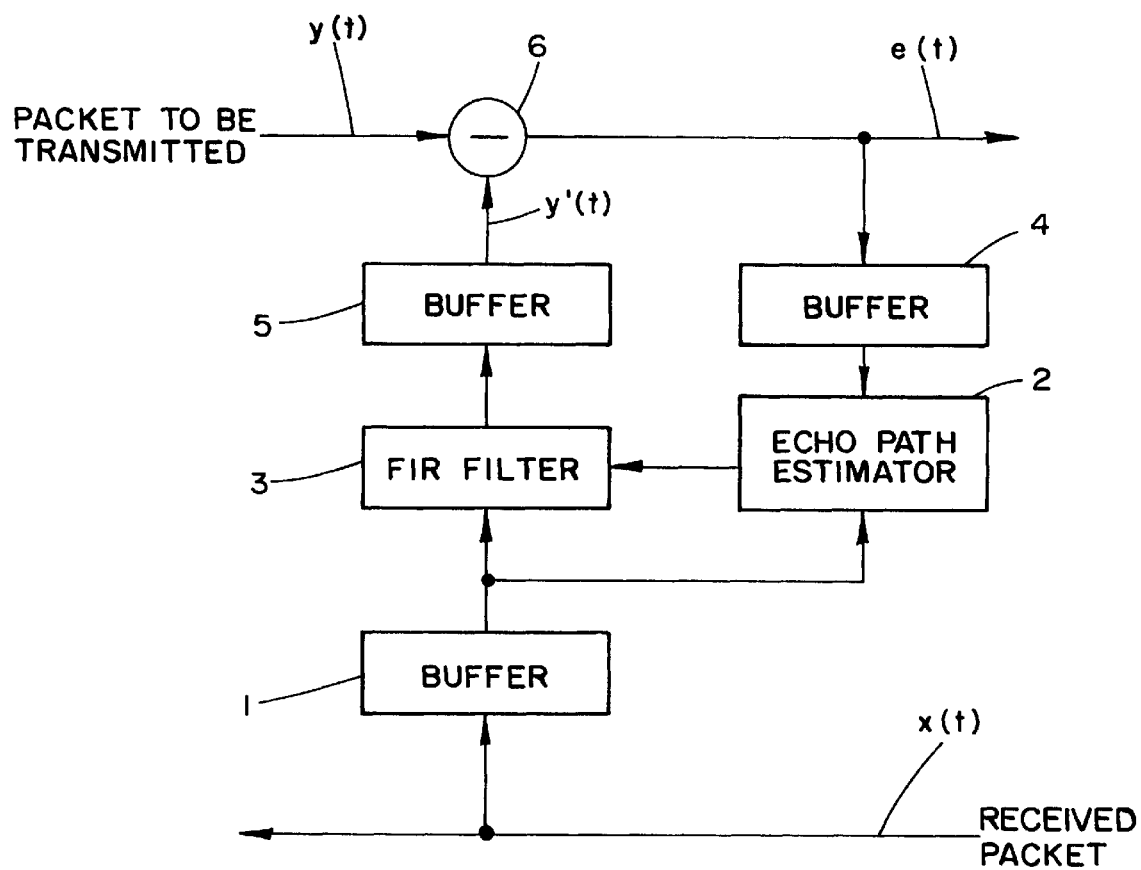
FIG. 1 is a block diagram schematically showing an echo canceller embodying the present invention.

In the drawings, identical references denote identical structural elements.

DETAILED DESCRIPTION OF THE PREFERRED EMBODIMENT

Referring to FIG. 1 of the drawings, an echo canceller embodying the present invention is shown. As shown, a received packet x(t) is transformed to a data signal having a preselected rate by a buffer 1 and then fed to an echo path estimator 2 and an FIR filter 3. On the other hand, a packet y(t) to be transmitted is applied to a subtracter 6. The subtracter 6 performs subtraction with the packet y(t) and a false echo (packet format) y'(t) and thereby cancels an echo. An echo (packet format) e(t) remaining after the echo cancellation is transformed to data having a preselected rate by a buffer 4. The data output from the buffer 4 is applied to the echo path estimator 2.

The echo path estimator 2 updates, based on the residual echo and received packet, filter coefficients meant for the FIR filter 3 and for estimating an echo path. The updated filter coefficients are transferred to the FIR filter 3. The FIR filter 3 performs convolutional computations with the updated filter coefficients and received packet in order to estimate a false echo. A buffer 5 packetizes the estimated false echo by conversion inverse to the rate conversion performed by the buffers 1 and 4, thereby outputting the false echo packet signal y'(t). The subtracter 6 executes subtraction with the false echo packet signal y'(t) and packet y(t) to be transmitted, as state previously.

The previously stated identification-by-learning method available for an FIR filter included in an echo canceller will be described. Assume that the FIR filter has N taps. Then, a false echo component y'(t) at a time t is produced by:

$$y'(t) = \sum_{i=0}^{N-1} \omega i(t) \times (t-i) \quad \text{Eq...(1)}$$

$$0 \leq i \leq N-1$$

where $\Sigma$ is representative of the total of t=0~N−1 (this is also true in the following description), and $\omega i(t)$ is representative of a reference signal (received signal) at the time t.

Echo cancellation is executed by the following subtraction:

$$e(t)=y(t)-y'(t) \quad \text{Eq. (2)}$$

The filter coefficients ωi(t) are updated such that the residual echo signal e(t) of the Eq. (2) becomes smallest, by the following equation:

$$\omega i(t+1) = \omega i(t) + \mu(t) \cdot e(t) \cdot x(t-i) \quad \text{Eq. (3)}$$

With the filter coefficients updated by the above Eq. (3), the echo canceller estimates an echo path. The Eq. (3) has a step size $\mu(t)$ expressed as:

$$\mu(t) = \mu 0 / px(t) \quad \text{Eq. (4)}$$

where $\mu 0$ is a positive constant having influence on the convergence time, and PX(t) is the power of the reference signal. In accordance with the identification-by-learning principle, the power PX(t) is produced by:

$$PX(t) - \Sigma x(t-i)^2 \quad \text{Eq. (5)}$$

As the Eqs. (1)–(5) indicate, computations proportional to the number N are necessary to generate a false echo, compute the power of a reference signal, and update the filter coefficients. The identification-by-learning method performs the above computations for echo estimation sample by sample. Therefore, processing between the input and output of a packet to be transmitted must be executed at a high speed.

In light of the above, it has been customary to convert the rate between the input and the output of packet data to be transmitted. This, however, increases the delay of the packet data, as discussed earlier.

Referring again to FIG. 1, in the illustrative embodiment, the echo path estimator 2 and FIR filter 3 respectively perform echo path estimation (Eqs. (3)–(5)) and false echo generation (Eq. 1) after the transform of the signal rate. Then, the subtracter 6 performs echo cancellation (Eq. 1) without any signal rate conversion.

Figure 2:
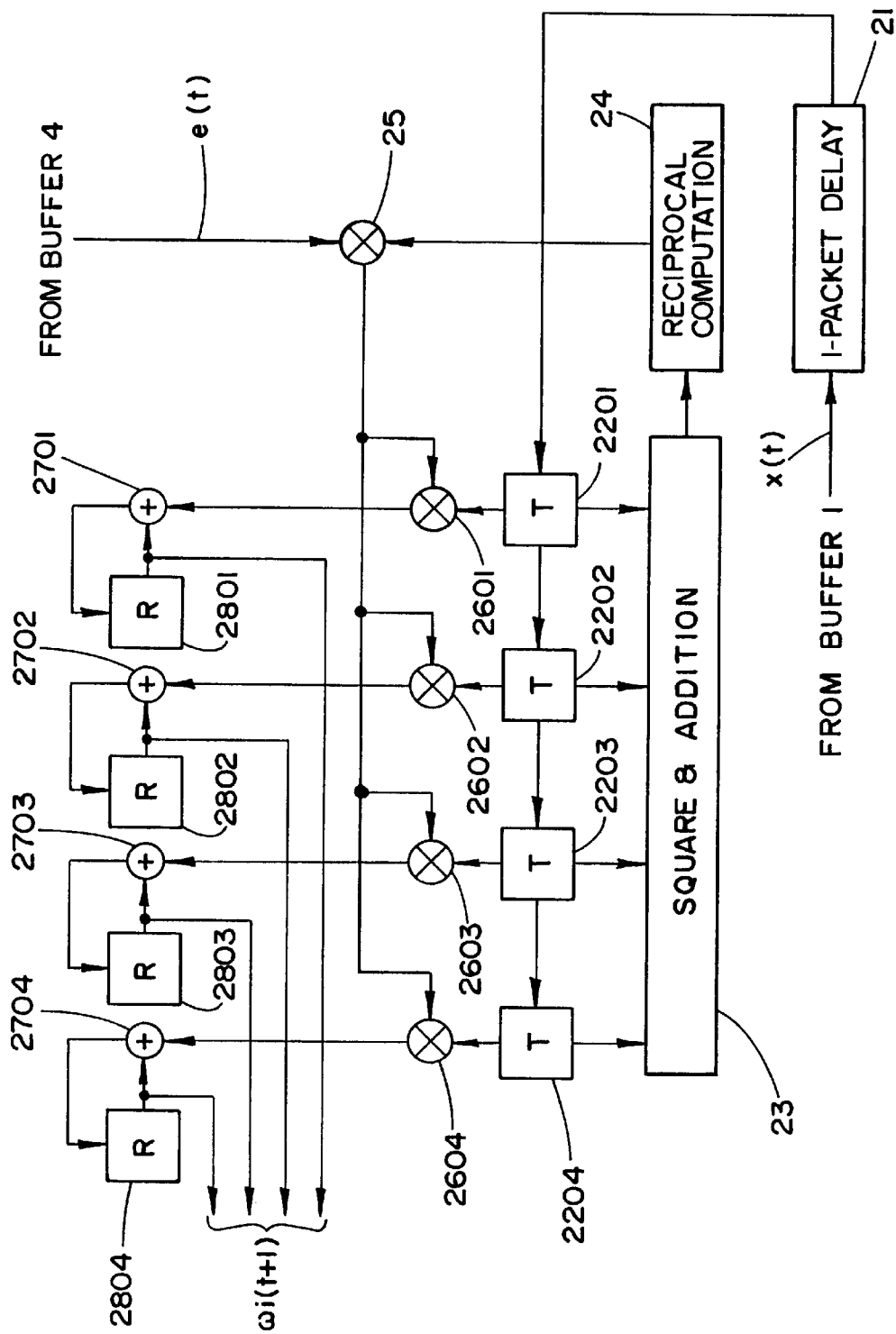
FIG. 2 is a block diagram schematically showing a specific construction of an echo path estimator included in the embodiment.

FIG. 2 shows a specific configuration of the echo path estimator 2. As shown, the estimator 2 includes one-packet delay 21 to which the received data output from the buffer 1 are applied. The delay 21 delays the input data by a period of time corresponding to a single packet. This is because the echo component included in the packet signal to be transmitted is delayed by a period of time corresponding to a speech packet signal reproduced from the received packet signal by at least one packet data, i.e . . . , because echo estimation should take account of the fixed delay corresponding to one packet data.

In the illustrative embodiment, the number N is assumed to be 4. The delayed data output from the delay 21 are applied to four shift registers 2201–2204 and sequentially shifted thereby sample by sample. At the same time, the outputs of the shift registers 2201–2204 are individually squared and then added up by a square & addition 23, so that the Eq. (5) is generated. A reciprocal computation 24 produces the reciprocal of the output of the square and addition 23 and thereby generates the Eq. (4). The reciprocal output from the reciprocal computation 24 is fed to an multiplier 25.

The multiplier 25 multiplies the reciprocal by the residual echo component received from the buffer 4 and delivers its output to multipliers 2601–2604. The multipliers 2601–2604 multiply the output of the multiplier 25 by the outputs of the shift registers 2201–2204, respectively. As a result, the second term of the right side of the Eq. (3) is generated. The resulting products are fed from the multipliers 2601–2604 to adders 2701–2704, respectively.

Registers 2801–2804 store filter coefficients ωi(t) produced by the last sampling. The adders 2701–2704 add the products received from the multipliers 2601–2604 to the filter coefficients ωi(t) to thereby generate filter coefficients ωi(t+1), as represented by the Eq. (3).

Figure 4:
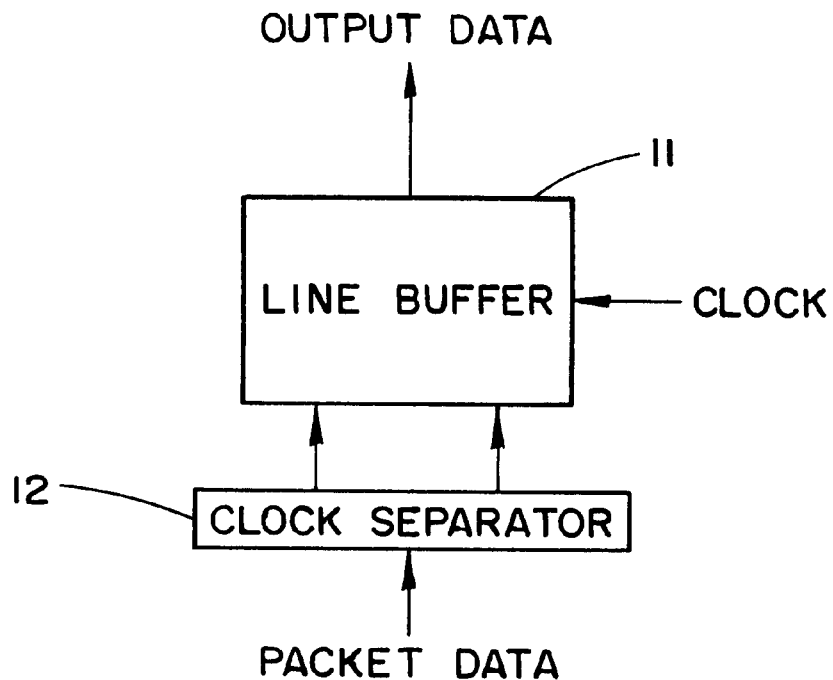
FIG. 4 is a block diagram schematically showing a specific configuration of one of rate conversion buffers further included in the embodiment.
Figure 5A:
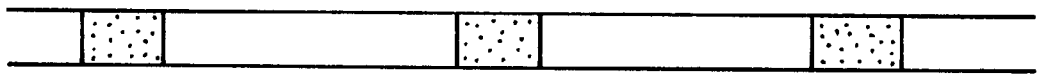
FIGS. 5A and 5B demonstrate the operation of the rate conversion buffer shown in FIG. 4.
Figure 5B:

FIG. 4 shows a specific configuration of each of the buffers 1 and 4 for signal rate conversion. As shown, the buffer is made up of a line buffer 11 and a clock separator 12. The clock separator 12 separates a clock component from input packet data represented by smeared portions in FIG. 5A. The clock component is used as a timing clock for writing data in the line buffer 11. The data are read out of the line buffer 11 in synchronism with a clock signal having a preselected rate (frequency), as shown in FIG. 5B.

Figure 3:
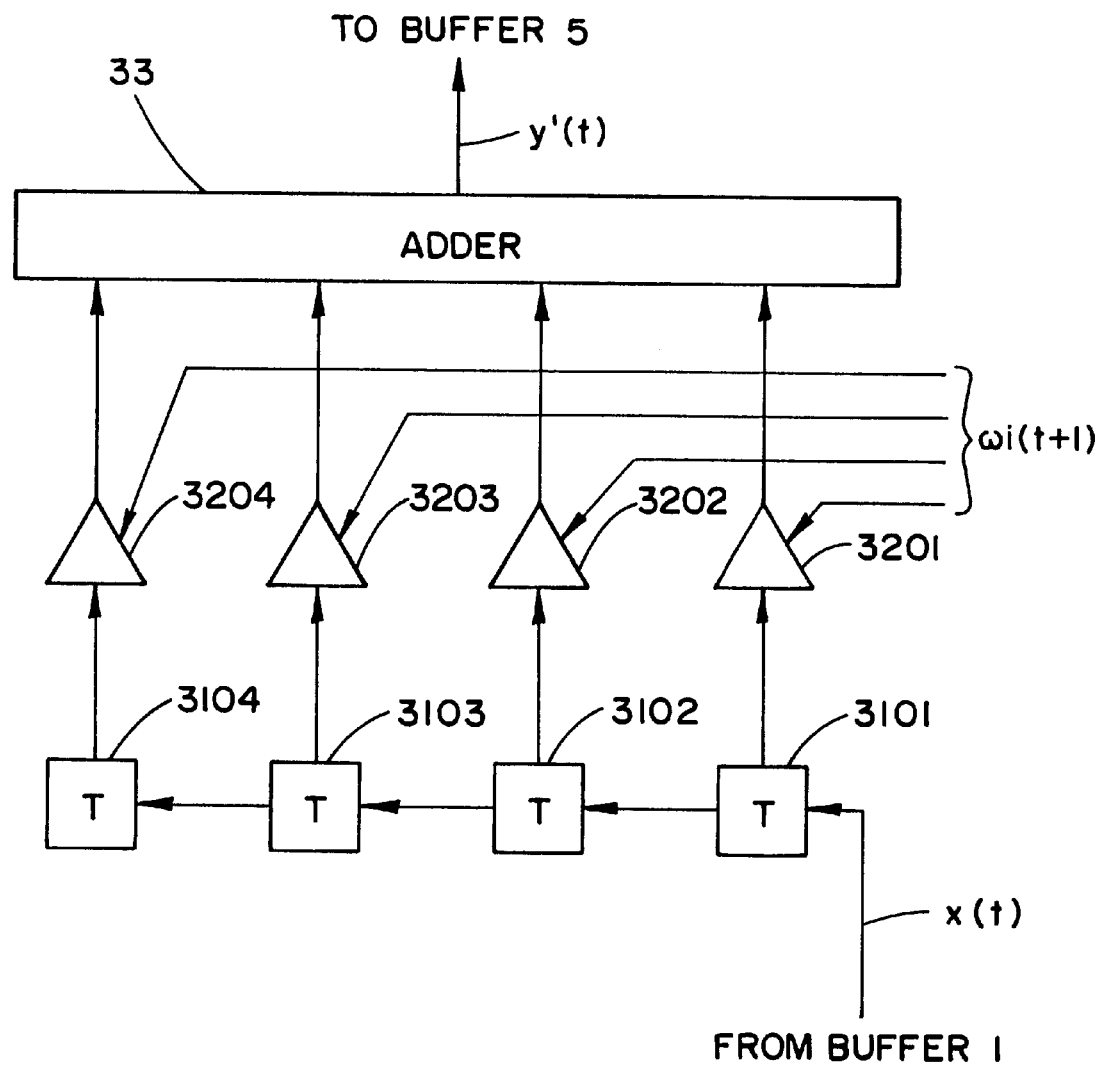
FIG. 3 is a block diagram schematically showing a specific configuration of an FIR filter also included in the embodiment.

The FIR filter 3 may have a specific configuration shown in FIG. 3. As shown, the received data from the buffer 1 are input to and sequentially shifted by shift registers 3101–3104. The resulting outputs of the shift registers 3101–3104 are fed to coefficient multipliers 3201–3204, respectively. These multipliers 3201–3204 respectively multiply the outputs of the shift registers 3101–3104 by the filter coefficients ωi(t+1) transferred thereto from the echo path estimator 2 and delivers the resulting products to an adder 33. The adder 33 adds the outputs of the multipliers 3201–3204, i.e.., performs convolutional computation. As a result, a false echo component represented by the Eq. (1) is produced.

Figures 6, 7A, 7B:
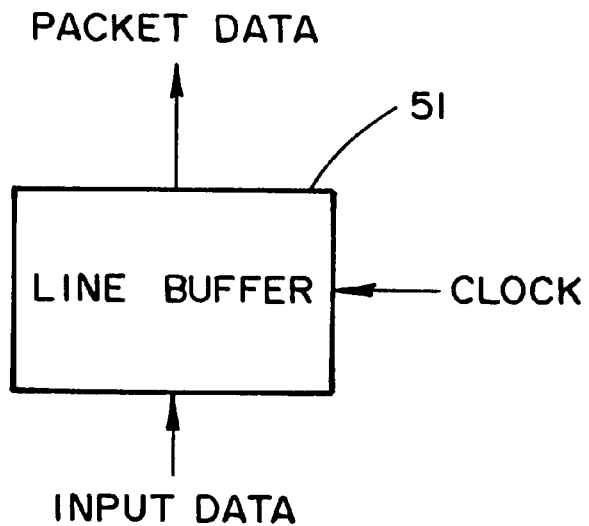
FIG. 6 is a schematic block diagram showing a specific configuration of an inverse rate conversion buffer included in the embodiment.
FIGS. 7A and 7B demonstrate the operation of the inverse rate conversion buffer shown in FIG. 6.

The buffer 5, FIG. 1, transforms the above false echo component to a packet format. Specifically, as shown in FIG. 6, the buffer 5 is implemented by a line buffer 51. FIG. 7A shows data input to the line buffer 51 in synchronism with a clock. The line buffer 51 packetizes the input data and converts their rate to that of the packet data, as shown in FIG. 7B. As a result, the subtracter 6, FIG. 1 subtracts the packetized false echo signal from the packet signal to be transmitted, thereby performing echo cancellation represented by the Eq. (1).

As stated above and as FIG. 1 indicates, only subtraction is performed between the input and the output of the transmission line. This eliminates rate conversion and therefore prevents the delay of the packet data from increasing.

What is claimed is:

1. An echo canceller comprising:
    first rate converting means for converting a received packet signal to data having a preselected rate;
    subtracting means for subtracting an echo packet signal from a packet signal to be transmitted to thereby output a residual echo packet signal;
    second rate converting means for converting said residual echo packet signal to data having the preselected rate;
    echo path estimating means for estimating an echo path characteristic based on outputs of said first and second rate converting means to thereby generate filter coefficients matching said echo path characteristic;
    a filter for filtering an output of the first rate converting means by using said filter coefficients to thereby output an estimated echo packet signal; and
    third rate converting means for converting said estimated echo packet signal to said echo packet signal.

2. An echo canceller as claimed in claim 1, wherein said echo path estimating means comprises:
    shift registers for sequentially shifting an output of said first rate converting means;
    a square and addition unit for squaring and adding outputs of said shift registers;
    a reciprocal computing unit for computing a reciprocal of an output of said square and addition unit;
    an adder for adding an output of said reciprocal computing unit and data output from said second rate converting means;

multipliers for respectively multiplying an output of said multiplier by the outputs of said shift registers; and adding means for adding outputs of said multipliers and last outputs of said multipliers to thereby generate the filter coefficients.

3. An echo canceller as claimed in claim 2, wherein said echo path estimating means further comprises a delay unit for delaying data output from said first rate converting means by a period of time corresponding to a single packet, and wherein an output of said delay unit is applied to said shift registers.

4. An echo canceller as claimed in claim 1, wherein said filter comprises an FIR (Finite Impulse Response) filter for performing convolutional computation with the filter coefficients transferred from said echo path estimating means and data output from said first rate converting means.

5. An echo canceller comprising:

a subtracter for subtracting an echo packet from a packet to be transmitted and having a first rate to thereby output a residual echo packet having said first rate;

an echo path estimating circuit for estimating an echo path with a second rate;

a filter for outputting, in response to a received packet signal and said echo path estimated, an estimated echo packet having said second rate; and a converting means for converting said estimated echo packet having said second rate to an echo packet having said first rate.

6. An echo canceller as claimed in claim 5, wherein said first rate is higher than said second rate.

* * * * *